US010762161B2

(12) United States Patent
Rao et al.

(10) Patent No.: US 10,762,161 B2
(45) Date of Patent: Sep. 1, 2020

(54) INTELLIGENT HUMANOID INTERACTIVE CONTENT RECOMMENDER

(71) Applicant: Accenture Global Solutions Limited, Dublin (IE)

(72) Inventors: Srikanth G. Rao, Bangalore (IN); Roshni Ramesh Ramnani, Bangalore (IN); Tarun Singhal, Bulandshahr (IN); Shubhashis Sengupta, Bangalore (IN); Tirupal Rao Ravilla, Tirupati (IN); Dongay Choudary Nuvvula, Bangalore (IN); Soumya Chandran, Bangalore (IN); Sumitraj Ganapat Patil, Belgaum (IN); Rakesh Thimmaiah, Bangalore (IN); Sanjay Podder, Thane (IN); Surya Kumar IVG, Chennai (IN); Ranjana Bhalchandra Narawane, Mumbai (IN)

(73) Assignee: Accenture Global Solutions Limited, Dublin (IE)

( * ) Notice: Subject to any disclaimer, the term of this patent is extended or adjusted under 35 U.S.C. 154(b) by 406 days.

(21) Appl. No.: 15/824,305

(22) Filed: Nov. 28, 2017

(65) Prior Publication Data

US 2019/0050494 A1    Feb. 14, 2019

(30) Foreign Application Priority Data

Aug. 8, 2017 (IN) .............................. 201711028120

(51) Int. Cl.
*G06F 16/30* (2019.01)
*G06F 16/957* (2019.01)
(Continued)

(52) U.S. Cl.
CPC ........ *G06F 16/9577* (2019.01); *G06F 16/313* (2019.01); *G06F 16/34* (2019.01);
(Continued)

(58) Field of Classification Search
CPC ........................... G06F 16/313; G06F 16/7867
See application file for complete search history.

(56) References Cited

U.S. PATENT DOCUMENTS

| 8,468,164 | B1 | 6/2013 | Paleja et al. |
| 8,706,503 | B2 | 4/2014 | Cheyer et al. |

(Continued)

FOREIGN PATENT DOCUMENTS

| EP | 2628293 | 8/2013 |
| WO | WO2015/054361 | 5/2015 |

OTHER PUBLICATIONS

"Everything You Need to Know About AI Assistants, From Siri to Ozlo," retrieved from <https://www.fastcompany.com/3059719/handicapping-the-ai-assistants-from-siri-to-ozlo>, May 17, 2016, 49 pages.

(Continued)

*Primary Examiner* — Mahesh H Dwivedi
(74) *Attorney, Agent, or Firm* — Fish & Richardson P.C.

(57) ABSTRACT

Methods and systems including computer programs encoded on a computer storage medium, for interactive content recommendation. In one aspect, a method includes receiving a request for content by a user, determining a user intent based on the received request, providing to the user a first attribute responsive to the user intent, receiving a first attribute value responsive to the first attribute, providing a second attribute, and receiving a second attribute value responsive to the second attribute. A particular content vector including a first content attribute and a second content attribute for a particular content item is identified where the first content attribute and the second content attribute sufficiently match the first attribute value and the second attribute value. The particular content item is provided as a suggested content item, and, responsive to a user selection of (Continued)

the particular content item, provided for presentation on the user device.

18 Claims, 6 Drawing Sheets

(51) Int. Cl.
| | | |
|---|---|---|
| *G06F 16/31* | (2019.01) | |
| *G06F 16/78* | (2019.01) | |
| *G06F 16/435* | (2019.01) | |
| *G06F 16/34* | (2019.01) | |
| *G06F 40/30* | (2020.01) | |
| *G06F 3/0482* | (2013.01) | |

(52) U.S. Cl.
CPC ........ *G06F 16/435* (2019.01); *G06F 16/7867* (2019.01); *G06F 3/0482* (2013.01); *G06F 40/30* (2020.01)

(56) References Cited

U.S. PATENT DOCUMENTS

| | | | |
|---|---|---|---|
| 9,318,108 B2 | 4/2016 | Gruber et al. | |
| 9,338,493 B2 | 5/2016 | Van Os et al. | |
| 9,672,827 B1* | 6/2017 | Jheeta | G06F 16/338 |
| 2012/0016678 A1* | 1/2012 | Gruber | G06F 9/54 |
| | | | 704/275 |
| 2012/0096013 A1* | 4/2012 | Ciancutti | G06F 16/907 |
| | | | 707/749 |
| 2012/0317492 A1 | 12/2012 | Sheeder | |
| 2013/0041976 A1 | 2/2013 | Hendricks et al. | |
| 2013/0080907 A1 | 3/2013 | Skelton | |
| 2013/0283168 A1* | 10/2013 | Brown | G06F 3/165 |
| | | | 715/728 |
| 2014/0040274 A1* | 2/2014 | Aravamudan | G06F 16/367 |
| | | | 707/741 |
| 2014/0136541 A1* | 5/2014 | Farahat | G06F 16/958 |
| | | | 707/740 |
| 2014/0258309 A1* | 9/2014 | Young | G06F 16/24578 |
| | | | 707/748 |
| 2014/0279756 A1* | 9/2014 | Whitman | G06N 5/003 |
| | | | 706/12 |
| 2014/0280292 A1* | 9/2014 | Skinder | G06F 16/3338 |
| | | | 707/767 |
| 2014/0359669 A1* | 12/2014 | Lemus | H04N 21/47202 |
| | | | 725/41 |
| 2015/0100987 A1* | 4/2015 | Whitman | G06F 16/334 |
| | | | 725/53 |
| 2015/0382047 A1* | 12/2015 | Van Os | G06F 16/73 |
| | | | 725/38 |
| 2016/0366458 A1 | 12/2016 | Whitman | |
| 2017/0068423 A1* | 3/2017 | Napolitano | G06F 16/90332 |
| 2017/0068670 A1* | 3/2017 | Orr | H04N 21/42204 |
| 2017/0228385 A1* | 8/2017 | Zheng | H04N 21/251 |
| 2017/0346949 A1* | 11/2017 | Sanghavi | H04M 3/5183 |
| 2018/0004760 A1* | 1/2018 | Bataller | G06F 16/75 |
| 2018/0090143 A1* | 3/2018 | Saddler | G10L 15/22 |
| 2018/0190278 A1* | 7/2018 | Gupta | G10L 15/22 |
| 2018/0232376 A1* | 8/2018 | Zhu | G06F 40/295 |
| 2018/0288477 A1* | 10/2018 | Gupta | G06F 3/0482 |
| 2018/0324490 A1* | 11/2018 | Anderson | H04N 21/42201 |
| 2019/0012198 A1* | 1/2019 | Ni | G06F 3/167 |

OTHER PUBLICATIONS

Mike Elgan, "Why Google A.I. is the last user interface," retrieved from <http://www.computerworld.com/article/3129098/artificial-intelligence/why-google-a-i-is-the-last-user-interface.html>, Oct. 8, 2016, 7 pages.

John Brandon, "Google Pixel phone packs a powerful voice assistant, but it's no Alexa," retrieved from <http://www.computerworld.com/article/3132396/personal-technology/google-pixel-phone-packs-a-powerful-voice-assistant-but-it-s-no-alexa.html#tk.drr_mlt>, Oct. 18, 2016, 3 pages.

Jessi Hempel, "Facebook Launches M, Its Bold Answer to Siri and Cortana" Business, retrieved from <https://www.wired.com/2015/08/facebook-launches-m-new-kind-virtual-assistant/>, Aug. 26, 2015, 8 pages.

Linden, Greg, Steve Hanks, and Neal Lesh. "Interactive assessment of user preference models: The automated travel assistant." User Modeling: Proceedings of the Sixth International Conference, UM97, 1997, 12 pages.

Chen, Li, and Pearl Pu. "Critiquing-based recommenders: survey and emerging trends." User Modeling and User-Adapted Interaction 22.1 (2012): 125-150.

Shabana Arora, "Recommendation Engines: How Amazon and Nefflix Are Winning the Personalization Battle," retrieved from <https://www.martechadvisor.com/articles/customer-experience/recommendation-engines-how-amazon-and-netflix-are-winning-the-personalization-battle/>, Jun. 28, 2016, 6 pages.

Gaurav Sharma "Bots, Chat, Voice, Zero UI, and the future of Mobile Apps," retrieved from <https://chatbotsmagazine.com/the-future-of-ui-bots-conversation-voice-zero-ui-and-the-end-of-the-mobile-apps-defa5dcc09f5>, Mar. 27, 2016, 18 pages.

Braina—Artificial Intelligence Software for Windows, retrieved on May 12, 2017, from <https://www.brainasoft.com/braina/>, 8 pages.

Bergamaschi, Sonia, Laura Po, and Serena Sorrentino. "Comparing Topic Models for a Movie Recommendation System." WEBIST (2). 2014, 12 pages.

European Search Report in European application No. 18184656.9, dated Nov. 6, 2018, 11 pages.

U.S. Appl. No. 15/487,061, filed Apr. 13, 2017, Ramnani et al.

EP Office Action in European Application No. EP 18184656.9, dated Apr. 2, 2020, 10 pages.

IN Office Action in Indian Application No. 201711028120, dated Mar. 13, 2020, 7 pages.

\* cited by examiner

INTELLIGENT HUMANOID INTERACTIVE CONTENT RECOMMENDER

CROSS-REFERENCE TO RELATED APPLICATION

This application claims priority to Indian Patent Application No. 201711028120, filed on Aug. 8, 2017, entitled "INTELLIGENT HUMANOID INTERACTIVE CONTENT RECOMMENDER," the entirety of which is hereby incorporated by reference.

BACKGROUND

This specification generally relates to computer-based techniques for interactive content recommendation for selecting and providing customized content to users.

A user can have access to a large volume of media content from various sources, such that selection of a particular content item (e.g., movie, television program, music album, online books, streaming content) can be overwhelming without assistance. Content guidance can be provided in the form of saved selections (e.g., "continue watching your show?"), sorting by a content provider of content into various categories (e.g., "dramas," "comedies," "animated"), or other similar forms of streamlining a content selection process. However, while predictive technology may incorporate historical user preferences to recommend content, it can fail to account for changes in user taste, and unpremeditated user choices.

SUMMARY

This specification describes, among other things, techniques for computer-based interactive content recommendation for selecting and providing customized content to users. More particularly, implementations of the present disclosure are directed to interactive humanoid conversational entities (e.g., "virtual agents," "chatbots" or dialog processes) to provide recommended content to a user requesting a content item. Content items can include movies, television shows, video clips, music content, games, interactive media, web-based content, virtual reality content, or other forms of consumable media content.

Dialog processes (e.g., chatbots) are widely used as part of media content/entertainment websites, messaging platforms, and customer service providers. Through dialog-based simulated conversations, a dialog process can provide a range of automated assistance to a user, where the dialog process solicits one or more inputs from the user (e.g., in the form of a question) and process the user responses to provide additional solicitations, and/or take a particular action (e.g., provide recommended content).

In some implementations, actions include receiving, from a user on a user device and by a data processing apparatus, a request for content including a text string input, determining a user intent based on the text string input, providing to the user device a first attribute responsive to the user intent. A first attribute value is received from the user device responsive to the first attribute and a second attribute is provided to the user device. A second attribute value is received from the user device responsive to the second attribute. A particular content vector for a particular content item is identified, where the particular content vector includes a first content attribute describing the particular content item and a second content attribute describing the particular content item, and where the first content attribute and the second content attribute sufficiently match the first attribute value and the second attribute value, respectively. The particular content item is provided as a suggested content item to the user on the user device and upon receiving a user selection of the particular content item, providing for presentation on the user device the particular content item for presentation on the user device.

Other implementations of this aspect include corresponding systems, apparatus, and computer programs, configured to perform the actions of the methods, encoded on computer storage devices.

These and other implementations can each optionally include one or more of the following features. In some implementations, multiple user feedback items are received from multiple users, each user feedback item including an attribute value responsive to a content attribute describing a content item from multiple content items. Multiple categorical rating variables are received from multiple users, each categorical rating variable is responsive to a content item from the multiple content items. A content recommendation model is generated from the multiple user feedback items and the multiple categorical rating variables, the content recommendation model including a set of themes, each theme including a cluster of content items and corresponding user feedback items responsive to the content items. The set of themes is ranked, where each theme is assigned a ranking based on the multiple categorical rating variables for each content item included in the theme.

In some implementations, the multiple user feedback items includes multiple social network interactions with a user's social network by a set of other users in the user's social network. The user interactions can include interactions by the user with the user's social network.

In some implementations, a theme in the set of themes includes a cluster of content items selected based on a mood of the user.

In some implementations, receiving a user selection of the particular content item includes assigning a vector attribute score for the particular content vector and recoding the vector attribute score for the particular content vector for the user. The vector attribute score for the particular content vector can include navigational information for the user selection of the particular content item.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

Some implementations of the subject matter described herein can, in certain instances, achieve one or more of the following advantages. By using a weighted algorithm approach to build the content recommendation model, the interactive content recommendation model can provide increasingly more accurate recommendations for presentation of particular content items to a user as more user interactions take place. The interactive content recommendation model accepts both implicit and explicit feedback from users, such that the model is refined in subsequent interactions with the user. The content recommendation model factors in the navigational path taken by a user to arrive at a content item selection to improve future recommendations by the content recommendation model. The content recommendation model may also factor in a user mood and preferences to determine recommended content items, where metadata used to train the content recommendation model can be clustered by a user mood. Additionally, interactions between content items and users in the user's social network can be used to improve the recommended content suggestions by content recommendation model.

Content recommendation can also be based on explicit (such as Genre, Actor, Director, Cast etc.), as well as implicit/latent themes, which can be calculated through theme mining techniques applied to descriptions or plot of the content already viewed, as well as any new content.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

Like reference numbers and designations among the various drawings indicate like elements.

DETAILED DESCRIPTION

Implementations of the present disclosure are generally directed to techniques for computer-based interactive content recommendation for selecting and providing customized content to users. More particularly, implementations of the present disclosure are directed to interactive humanoid conversational entities (e.g., "virtual agents," "chatbots" or dialog processes) to provide recommended content to a user requesting a content item. Content items can include movies, television shows, video clips, music content, games, online e-books, interactive media, web-based streaming content, virtual reality content, or other forms of consumable media content.

In some implementations, actions include receiving a request (e.g., a text string input) for content by a user on a user device, determining a user intent based on the request, and providing a first attribute value to the user responsive to the determined user intent. A first attribute value is returned by the user responsive to the first attribute and a second attribute is provided to the user. A second attribute value is then returned by the user responsive to the second attribute. A particular content vector for a particular content item (e.g., a movie) is identified where the particular content vector includes a first content attribute and a second content attribute each describing the particular content item and where the first content attribute and the second content attributes sufficiently match the first attribute value and the second attribute values (provided by the user), respectively. The identified particular content item is then provided to the user on the user device as a suggested content item. The user can then select the identified particular content item and in response to the selection, the particular content item is provided to the user device for presentation (e.g., play the movie).

A content recommendation model can be generated as follows. Multiple user feedback items are received from multiple users, where each user feedback item includes an attribute value responsive to a content attribute describing a content item from a set of multiple content items. Multiple categorical rating variables from multiple users are received, where each categorical rating variable is responsive to a content item from the set of multiple content items. The content recommendation model is generated from the multiple user feedback items and the multiple categorical rating variables. The content recommendation model can include a set of themes, where each theme includes a cluster of content items and corresponding user feedback items that are responsive to each content item in the cluster of content items. The set of themes can be ranked such that each theme is assigned a ranking based on the multiple categorical rating variables for each content item included in the theme.

Figure 1:
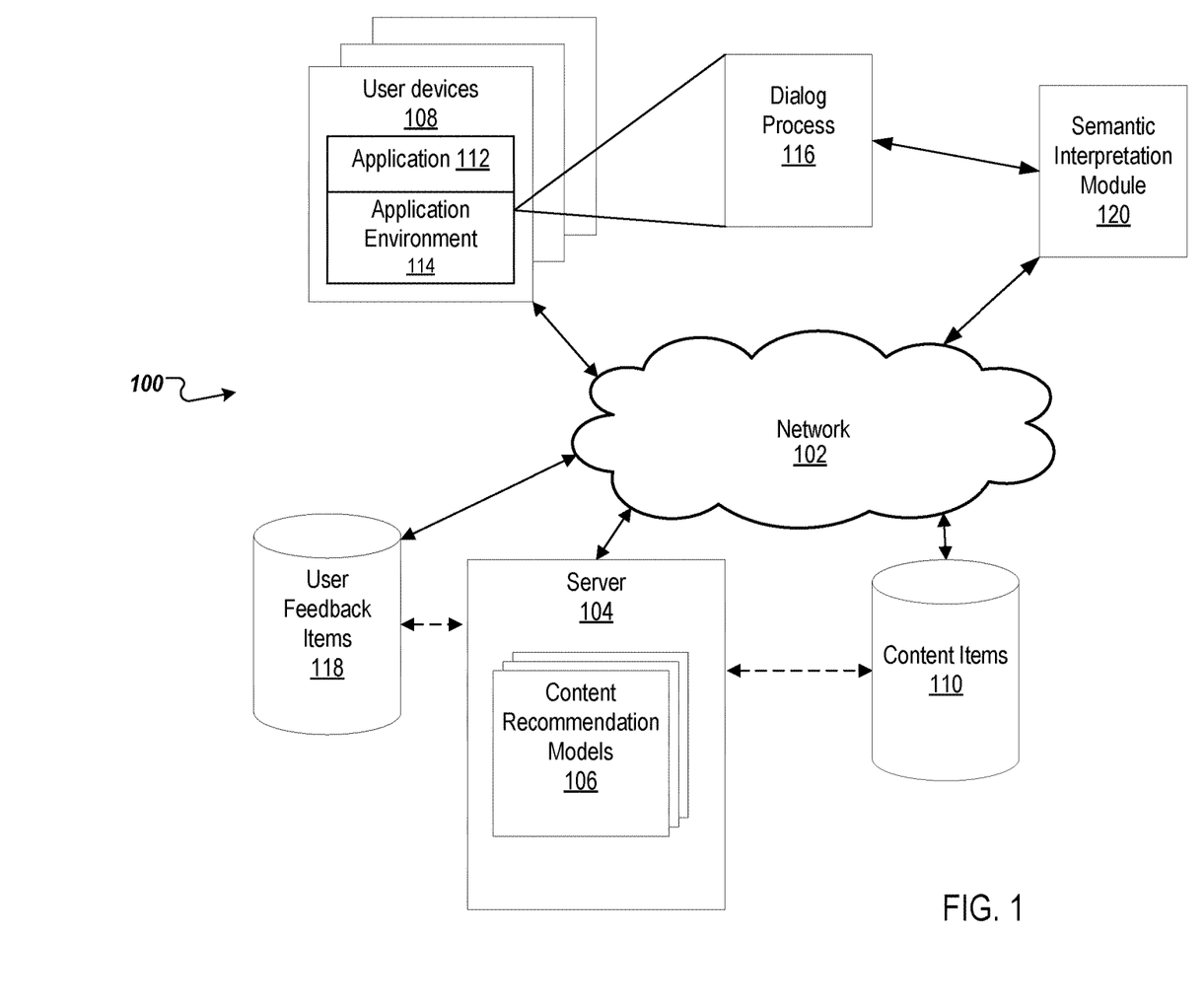
FIG. 1 is a block diagram of an example operating environment for interactive content recommendation.

FIG. 1 is a block diagram of an example operating environment 100 for interactive content recommendation. The example operating environment 100 includes a computer network 102, such as a local area network (LAN), the Internet, or a combination thereof, connecting a server computer 104 that includes one or more content recommendations models 106, user devices 108, and content items 110. The server computer 104 is represented in FIG. 1 as a single entity, but can include multiple different servers in communication directly or over the network 102.

A user device 108 is an electronic device capable of requesting and receiving content items 110 over the network 102. Example user devices 108 include personal computers, mobile communication devices, and other devices that can send and receive data over the network 102. A user device 108 typically includes a user application 112, such as a web browser or native application, to facilitate the sending and receiving of data in an application environment 114 (e.g., a graphical user interface), including content items 110 (e.g., movies, television shows, music, e-books, streaming content, or other media content), over the network 102. The web browser can enable a user to display and interact with text, images, videos, music and other information typically located on a web page at a website on the world wide web or a local area network.

The user application 112 can include a dialog process 116 displayed in an active window of the application environment 114, for example, a chatbot or another virtual agent, to provide an interactive content selection experience to a user on a user device 108. Dialog process 116 can be executed on the user device 108 or provided to the user device 108 by server 104 through the network 102. The dialog process 116 can utilize one or more content recommendation models 106 to select a content item 110 for presentation in the application environment 114 on the user device 108.

The one or more content recommendation models 106 can be trained using a repository of content items 110 and a repository of user feedback items 118. In some implementations, a content recommendation model 106 is trained by explicit user feedback, as discussed in more detail below with reference to FIG. 3. In some implementations, a content recommendation model 106 is trained by implicit user feedback, as discussed in more detail below with reference to FIG. 4. A content recommendation model 106 can be trained using a combination of implicit and explicit user feedback, where a relative weighting for each of the implicit and explicit user feedback in training the content recommendation model 106 can be the same or different.

Content items 110 can include a set of content attributes $[C_i a_1, C_i a_2, \ldots, C_i a_N]$ for each content item $[C_i]$ in the repository of content items 110. In some implementations, content attributes represent categories used to characterize the content item. Content attributes for a movie or television program content item include, for example, title, actors, director, run time, genre, year, and main characters. Content attributes for a music content item include, for example, musicians, band name, genre, year, title, and track titles. Content attributes for a content item 110 can be defined by a provider (e.g., a distributor) of the content item 110, and/or can be defined by users through providing user feedback items 118.

User feedback items 118 can include structured and/or unstructured user feedback data, where each item of user feedback data is provided by a user from a set of multiple users on user devices 108 in response to content items 110. Unstructured user feedback data includes freeform responses by users in response to content item recommendations and/or presentation, a user input responsive to a query from a dialog process, and/or a combination thereof. In some implementations, unstructured feedback can include an "emoji" that carries the sentiment expressed by the user. An example of unstructured user feedback includes a user response "The Godfather is not a funny movie" in response to a recommended content item 110 as the movie "The Godfather." Structured user feedback includes user selections and/or rejections responsive recommended content items, user partial or complete viewings of recommended content items, or other forms of direct feedback to the model regarding user preferences and/or selections of content items 110. Structured user feedback can include a "star rating system" in which users can rate a recommendation using a quantified value (e.g., 1-5 stars or the like). An example of a structured user feedback includes a user selection of the movie "Midnight in Paris" when presented with a selection of comedic films in response to requesting presentation of a romantic comedy.

In some implementations, a semantic interpretation module 120 performs semantic interpretation on a user request for content presentation. The user request can be input into the dialog process 116, and the semantic interpretation module 120 can receive one or more requests (e.g., text input string and/or voice command) and perform analysis to determine a user intent. For example, a user request can be "I want to watch something funny," where the semantic interpretation module 120 may determine a user intent from the input text string to be a request for a comedic content item (e.g., a comedy movie or comedy television program). The semantic interpretation module 120 can also receive a request for content presentation in the form of an ambiguous request, for example a user input query "I am bored," and determine a user intent requesting content presentation. The semantic interpretation module 120 can provide the semantic interpretation and resulting user intent to the content recommendation model 106 such that the content recommendation model 106 can determine a content item to provide to the user device 108 for presentation.

In some implementations, each content recommendation model 106 is trained for a particular user on a user device 108, for a particular user on multiple user devices 108 through a single login, and/or for a particular user device 108 that can include multiple users.

In some implementations, a content recommendation model 106 is trained using temporal data, such that recommendations for content items provided to the user of the user device 108 can vary based in part on a time of day and/or day of the week. For example, content recommendation can depend on whether the content is requested in an evening.

Figure 2A:
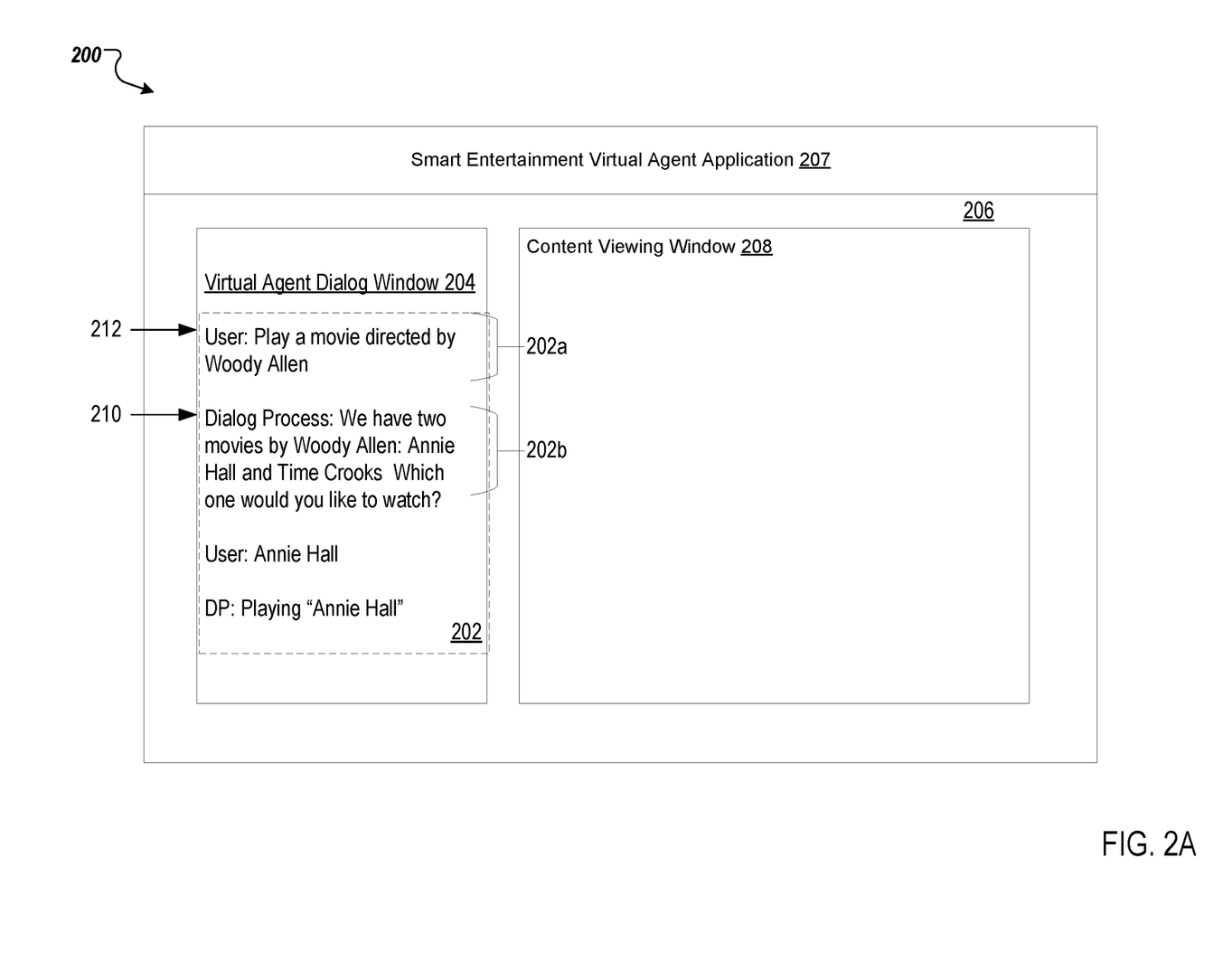
FIGS. 2A-2C schematically depict example dialog processes in a virtual agent dialog window in an application environment.
Figure 2B:
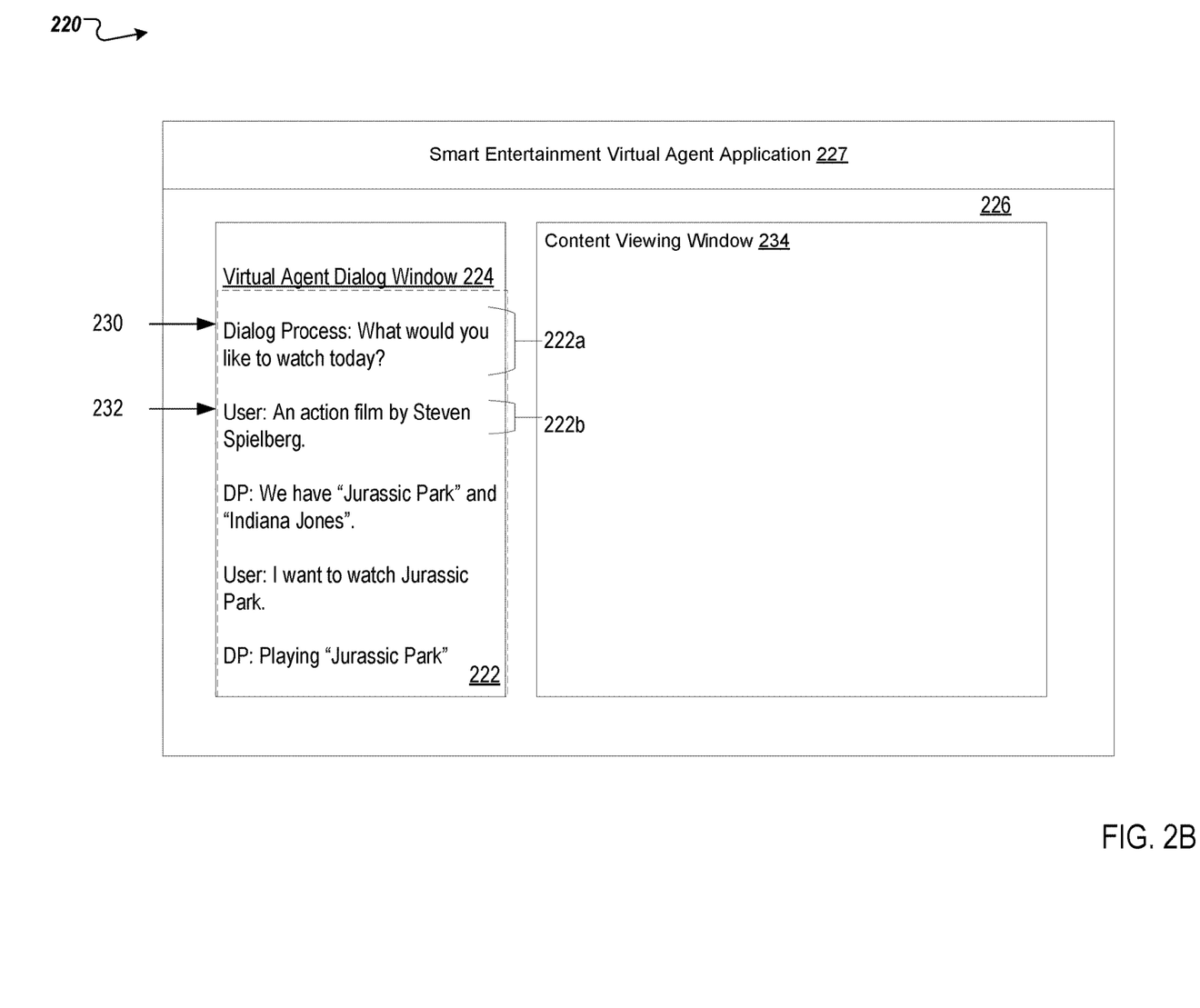
Figure 2C:
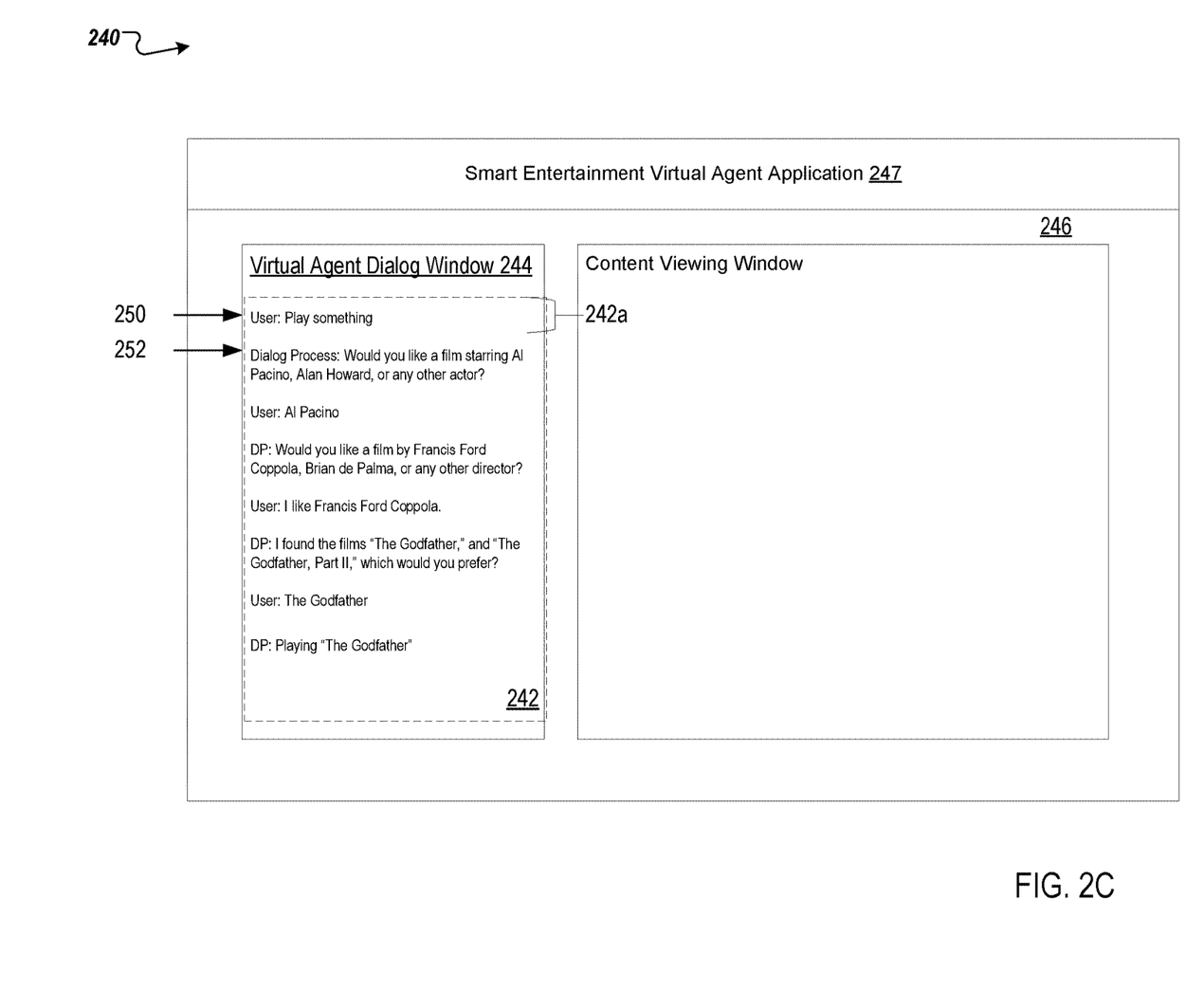

FIGS. 2A-2C schematically depict example dialog processes in a virtual agent dialog window in an application environment. Processes through which a dialog process may interact with a user to provide suggested content items is described in more detail with reference to FIG. 3.

FIG. 2A schematically depicts an example dialog process interaction 202 in a virtual agent dialog window 204 in an application environment 206 of a smart entertainment virtual agent application 207. The smart entertainment virtual agent application can execute locally on a user device (e.g., application 112 on user device 108), and/or can be located at a server (e.g., server 104) and accessed by a user device 108 over the network 102.

The application environment 206 can include a content viewing window 208 where a content item (e.g., a movie) can be displayed. A dialog process interaction 202 in the application environment 206 is a natural-language conversation between a user and the smart entertainment virtual agent application 207 using data provided by a content recommendation model (e.g., content recommendation model 106) over a network 102. The dialog process interaction 202 in the virtual agent dialog window 204 can include a series of one or more queries and responses between a dialog process 210 (e.g., a content recommendation model 106 on a server 104) and the user 212 (e.g., a user on a user device 108).

In some implementations, a dialog process interaction 202 is initiated in the virtual agent dialog window 204 by an initial query 202a by a user 212 (e.g., a request for presentation of a content item), and is followed by a request for input 202b responsive to the initial user query by the dialog process 210 (e.g., a clarifying question responsive to the initial request for presentation of a content item). For example, a user 212 inputs "Play a movie directed by Woody Allen" in the form of a text string input and/or a voice command, and the dialog process 210 responds with "We have two movies by Woody Allen: Annie Hall and Time Crooks. Which one would you like to watch?" In some implementations, the user input is a single criterion, such that one descriptive term (e.g., an attribute value) is defined in the query. For example, director "Woody Allen" is criteria provided by the user in the user input 202a.

The dialog process interaction 202 proceeds until the content recommendation model 106 selects one or more content items as suggested content items for presentation to the user 212. The one or more content items presented to the user 212 as suggested content items can be selected by the user 212 for presentation in the content viewing window 208. For example, the selected content item (e.g., the movie "Annie Hall") can be displayed in the content viewing window 208. In some implementations, the virtual agent dialog window 204 is inactive (e.g., hidden from the active window and/or minimized) during the viewing of content in the content viewing window 208.

In some implementations, a dialog process is initiated in the virtual agent dialog window by a user initiating an active window of the smart entertainment virtual agent application and/or the virtual agent dialog window. FIG. 2B schematically depicts another example dialog process interaction 222 in a virtual agent dialog window 224 in an application environment 226 of a smart entertainment virtual agent application 227. Dialog process interaction 222 in the virtual agent dialog window 224 is initiated by a dialog process 230 prompting a user 232 for an input 222a, e.g., "What would you like to watch today?" The prompt from the dialog process 230 can be initiated by a user 232 initiating an instantiation of the virtual agent dialog window 224 within the smart entertainment virtual agent application 227, and/or by initiating the smart entertainment virtual agent application 227 (e.g., opening the application) where the virtual agent dialog window 224 automatically launches and prompts the user for input. The dialog process interaction 222 proceeds between the dialog process 230 and the user 232 until a content item is suggested by the content recommendation model 106 and selected for presentation in the content viewing window 234 by the user 232.

In some implementations, a user input 222b includes multiple criteria. For example, a user 230 specifies two criteria in which a requested content item includes "an action film" and a director "Steven Spielberg." Additionally, one or more of the multiple criteria can be descriptive or a characteristic of the content item (e.g., "action" film).

FIG. 2C schematically depicts another example dialog process interaction 242 in a virtual agent dialog window 244 in an application environment 246 of a smart entertainment virtual agent dialog window 247. A user input 242a by a user 250 is an opened-ended (e.g., ambiguous or incomplete) request by the user 250 for presentation of a content item. For example "Play something," where the user is requesting a content item and a recommendation from the dialog process 252 for what content item to view. The dialog process 252 can then provide one or more recommended content items based in part on the content recommendation model 106 for the user 250. For example, if the content recommendation model 106 for user 250 determines that the user 250 has previously provided positive user feedback and/or selected to view films starring Robert DeNiro in action films, it may recommend similar actors who also star in action films.

In some implementations, multiple dialog templates can be used to provide a natural-language interaction between the dialog process (e.g., virtual agent dialog process interaction 202) and the user 212. A dialog template may be applied to a user input, for example, determining that a user input "Play a comedy movie" is intending "Play a <genre> movie." A dialog template can be applied to a dialog process response, for example, "Would you like to see a comedy starring <actor 1>, <actor 2>, or <actor 3>?" where each <actor 1>, <actor 2>, and <actor 3> are filled in by the content recommendation model as suggested actors for the user responsive to the request for content presentation.

Though the application environment depicted in FIGS. 2A-2C shows a dialog process and content viewing window in relative locations within the active window of the application environment, other configurations are imaginable (e.g., separate windows displaying a dialog process and the content viewing window and/or a dialog process that is not visually displayed but is voice-activated).

Explicit user feedback obtained through a dialog process interaction (e.g., through questions and answers between dialog process and user), similar to the dialog process interactions described with reference to FIGS. 2A-2C, can be used to train a content recommendation model.

Figure 3:
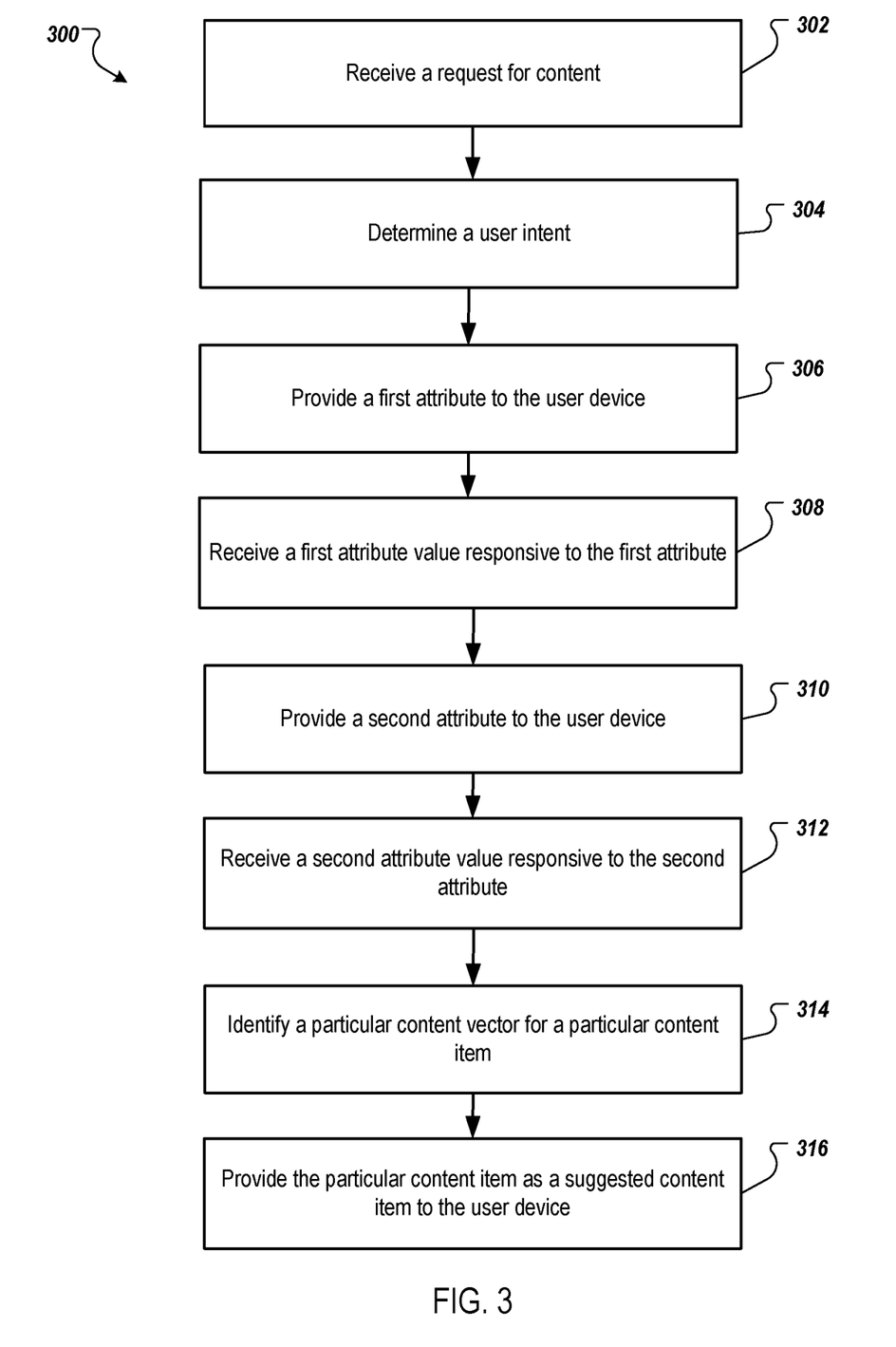
FIG. 3 is a flowchart of an example process for interactive content recommendation using explicit user feedback.

FIG. 3 is a flowchart of an example process 300 for interactive content recommendation using explicit user feedback. A request for content is received (302). The request can include a text input query, a voice-to-text command, or another form of user input. The request may be input into a dialog process 116 in an application environment (e.g., application environment 114, 206) on a user device 108. The request input in an application environment on the user device 108 can initiate an instantiation of a dialog process 116 (e.g., launch an interactive recommendation dialog process), similar to the dialog process interaction 202 in the virtual agent dialog window 204. For example, the request can include an explicit request by a user on the user device 108 for a content item (e.g., "I want to watch a movie") or an incomplete and/or ambiguous request for a content item (e.g., "I am bored"). The dialog process 116 in the application environment 114 can access a semantic interpretation module 120 to analyze the user input request.

The semantic interpretation module 120 can then determine a user intent (304) from the user request. User intent can be determined in part based on previously received requests for content items and selected (e.g., viewed) content items provided responsive to the requests. In some implementations, user intent may be based on a frequency analysis of previously received requests and content items provided responsive to the requests, for example, when a user requests an "action movie starring Al Pacino" the user intent is most likely to watch "The Godfather."

In some implementations, semantic interpretation can be done based on domain rules or using Latent Semantic processes, for example, using themes. For example, a rule-based approach includes analyzing user-provided statement including one or more sentiments and/or emotions (e.g., "I am bored"). The statement is analyzed using a sentiment analysis method or an emotion analysis method, for example, by using emotive or affective vocabulary. The content recommendation model is designed to reverse or enhance the polarity of the user-provided statement, depending in part on a degree of negativity or a degree of positivity of the statement, respectively. The user-provided statement can then be mapped to a corresponding theme on which content items are clustered. The user-provided statement "I am bored," for example, lends to an affective category of "disgust" or "sadness". The detected polarity is reversed and the content recommendation model searches for a cluster of content items which have an opposing theme, for example, "joyful," "happy," "pleasurable," or the like. If the user-provided statement is "I am feeling excited," the emotion detected can be determined to be positive. The positive emotion is reinforced in the search criteria, and themes such as "exciting" or "exhilarating" in the movies are searched. Theme mining to determine a latent theme of a set of content items (e.g., movies) can be done using, for example, a combined corpus of the movie plots, expert comments, and unstructured user feedback. In one implementation, this is done using a Latest Semantic Indexing technique, where a theme vector index may contain sentiment or emotion bearing words (like "satisfying", "moving", "joyous" etc.) and these terms can be used to identify the relevant movie clusters for a recommendation purpose.

A first attribute $a_1$ is provided to the user device 108 (306). The first attribute can be selected by the content recommendation model 106 based in part on the user intent, such that the first attribute is responsive to a determined user intent. For example, if a user intent is determined to be that the user is requesting presentation of a comedy, the first attribute can include text further specifying an attribute within the comedy genre (e.g., a director, an actor, a plot summary, or the like). At each point during the dialog process interaction with a user, the semantic interpretation module 120 can be used to determine a user intent from a user input provided.

The first attribute can be expressed in a conversational format by the dialog process 116, such that it prompts the user on the user device 108 for an input responsive to the first attribute. For example, "Would you like to view a comedy starring Will Farrell, John C Reilly, or Owen Wilson?" where "Will Farrell, John C Reilly, and Owen Wilson" represents a first attribute <actors> responsive to a user intent to watch a comedy.

A first attribute value responsive to the first attribute is received from the user device 108. A first attribute value can include clarifying details from the user that answer an aspect of the first attribute. For example, in response to the first attribute provided by the dialog process "Would you like to view a comedy starring Will Farrell, John C Reilly, or Owen Wilson?" a user may respond "Will Farrell" as a first attribute value. In another example, in response to a first attribute "Would you like to watch a comedy, a drama, or a documentary?" a user may respond "a drama" as a first attribute value.

A second attribute is provided to the user device (310). The second attribute can be selected in response to the first attribute value, where the second attribute is related to the first attribute value. The second attribute can be a further clarifying attribute, such that it further specifies the content item selection. For example, if a first attribute value is "Will Farrell", a second attribute can include a specification including movie titles, a plot summary, a second co-starring actor, or the like.

The user can then provide a second attribute value responsive to the second attribute (312). The second attribute value can be an answer to a question asked by the second attribute, and can include clarifying details from the user that answer an aspect of the second attribute. For example, a second attribute can be "Would you like to watch Will Farrell in Talladega Nights or in Anchorman?" and a second attribute value can include a response "I want to watch Talladega Nights." In another example, a second attribute can be "Would you like to watch a film starring Will Farrell and John C. Reilly, or Will Farrell and Mark Wahlberg?" where the second attribute includes a second actor (e.g., co-star) of a movie starring Will Farrell, and a second attribute value is "John C. Reilly."

In some implementations, multiple attributes (e.g., three or more) and corresponding attribute values are obtained by the dialog process 116 to provide to the content recommendation model 106. Multiple attributes can be used to further narrow the scope of possible content items available for suggestion to the user as possible content items.

The content recommendation model 106 can then identify a particular content vector for a particular content item (314). In some implementations, each content item 110 is represented by a content vector Ci with content attribute values {Cia1, Cia2, . . . CiaN}, where the content vector Ci represents a content item 110 and the content attribute values for the content vector describe attributes of the content item (e.g., title, genre, actors, directors, year, etc.). The content recommendation model 106 can match the first user-provided attribute value and the second user-provided attribute value to a first content attribute value and a second content attribute value, respectively, for a particular content vector representing a particular content item 110.

In some implementations, the content recommendation model 106 can sufficiently match the respective values, where an amount of sufficient matching can be determined based on a threshold of overlap between the first user-provided attribute value and the second user-provided attribute value to the first content attribute value and the second content attribute value, respectively, for the particular content vector representing the particular content item 110. Closeness matching between a user-provided attribute value to metadata of content items 110 can be done by the content recommendation model 106 using, for example, an explicit synonym list or a Wordnet-based synonym match. In some implementations, matching a larger text fragment of user-provided attribute values to content items 110, methods such as cosine similarity and/or a vector space model (VSM) can be employed. For example, a first user-provided attribute value "Beauty and the Monster" in response to attribute <title> can be determined to sufficiently match "Beauty and the Beast" for a first content attribute value. The threshold of overlap can be determined in part by a closeness of synonymous terms and/or related values.

In some implementations, content attribute values for a content vector Ci representing a content item 110 are determined by using online and/or offline user-specific descriptions (e.g., previous characterizations by one or more users of the particular content item). Content descriptions from various sources including content item databases (e.g., movie review databases, web-based encyclopedias, or the like) can be used to determine content attribute values for the content vector Ci representing a content item 110.

In some implementations, the content recommendation model 106 can determine a content vector where the first attribute value and the second attribute value have a degree of similarity above a threshold with a first content attribute value and a second content attribute value, respectively. The degree of similarity can be determined by comparing similar words and/or phrases. For example, a degree of similar can be determined using a WordNet-based method or cosine similarity method, providing a numerical similarity score normalized between 0 and 1.

In some implementations, the content recommendation model 106 may determine that not all attribute values match the content attribute values of a content vector, but may determine that a subset (e.g., a subset number above a threshold) of the attribute values sufficiently match content attribute values of the content vector. The content recommendation model 106 can determine to provide the content item represented by the content vector to the user as a suggested content item based on the partial match and/or a number of matches above a threshold of the subset of attribute values.

One or more particular content items are provided as a suggested content item to the user on the user device 108 (316). The suggested content item can be displayed in the application environment 114 as a selectable item (e.g., a link or an icon). A user on the user device 108 can select a suggested content item, which can be presented in an active window in the application environment 114 on the user device 108. In some implementations, the suggested content item can be automatically presented (e.g., video playback) in the application environment 114. An example application environment 114 including a dialog process and a content display window is discussed in more detail with reference to FIGS. 2A-C.

In some implementations, two or more content vectors can be identified by the content recommendation model 106 for respective two or more particular content items responsive to the user provided attribute values. In some implementations, the content recommendation model 106 provides additional attributes to the dialog process 116 as queries to the user device 108 to further specify features for identifying a particular content vector for a particular content item 110. In some implementations, multiple content items (e.g., a full or partial list of all content items with identified content vectors) are provided to the user device 108 as suggested content items.

In some implementations, a first attribute value is a negative response to the first attribute, such that the user response is indicative that the user is requesting a different attribute. For example, in response to a first attribute "Would you like to watch a comedy, an action, or a drama?" the user can provide a first attribute value "none of these" and/or "I want to watch a documentary."

In some implementations, a user selects a suggested content item for presentation on the user device 108 (e.g., in a content viewing window 208). The content recommendation model 106 can further refine based on the content vector Ci for the content item selected by the user. In some implementations, a vector attribute score is assigned to the particular content vector as result of a selected or non-selection of the content item represented by the content vector. A ranking for the content vector for the selected content item can be adjusted relative to other, similar content vectors each representing a different content item 110 based on the vector attribute scores for each content vector. For example, if a user selects to view "The Godfather" movie in response to content attribute values "Al Pacino" and "drama," a content vector for "The Godfather" content item can be ranked above other content items also containing attribute values "Al Pacino" and "drama" (e.g., a content vector representing the movie "Scarface").

In some implementations, the vector attribute score for a particular content vector includes navigational information for the user selection of the particular item, where the attributes provided during a selection process and attribute values received responsive to the attributes affect the vector attribute score for the particular content vector.

In some implementations, the content recommendation model 106 will suggest content items responsive to user-provided attribute values that additionally have not been viewed (or have been viewed infrequently) by the user on the user device 108. For example, if a user has viewed "Lord of the Rings: The Fellowship of the Rings" and "Two Towers," the content recommendation model 106 may suggest a content item "Return of the King" and/or "The Hobbit" as suggested content items responsive to a user request to view a content item.

Figure 4:
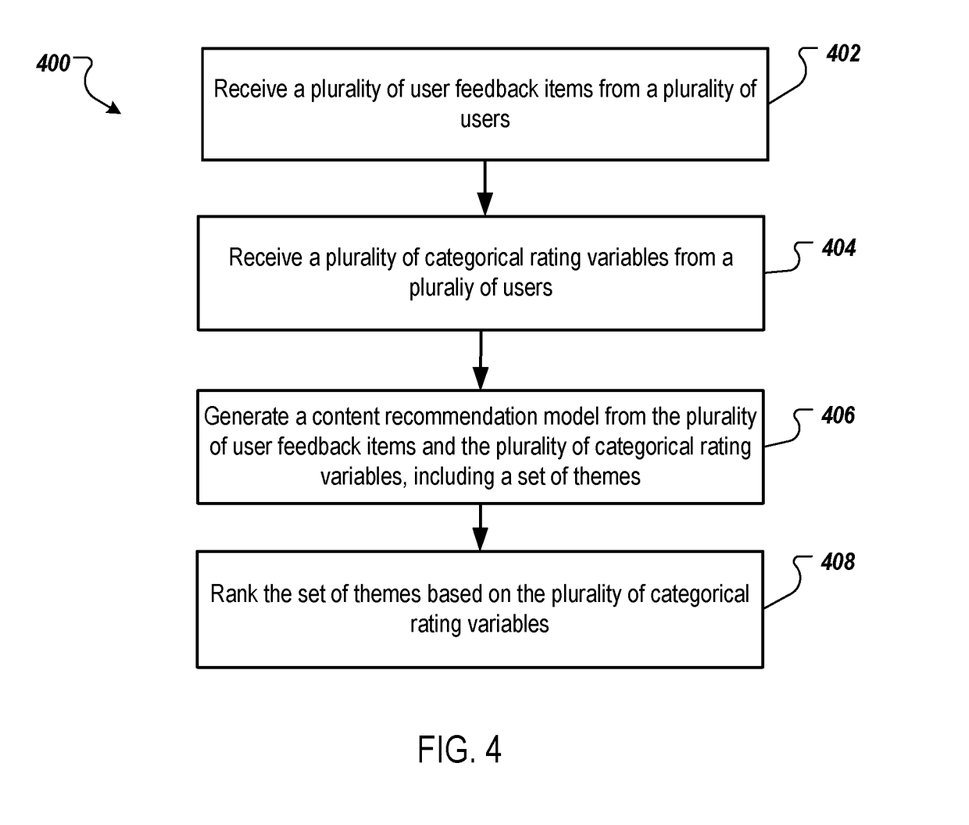
FIG. 4 is a flowchart of an example process for interactive content recommendation using implicit user feedback.

FIG. 4 is a flowchart of an example process 400 for interactive content recommendation using implicit user feedback. User feedback items 118 can be used to implicitly train a content recommendation model 106 for a user or set of users on one or more user device (e.g., a user accessing an account on a device, accessing an account on multiple devices, or multiple users accessing an account on a device).

In some implementations, multiple user feedback items are received from multiple users (402). User feedback items include any data regarding potential preference of a user with regards to content items 110. For example, user feedback items for a particular content item 110 includes a user's interactions with a social network, user feedback data from other users regarding the particular content item 110, and/or explicit feedback from the user responsive to other content items similar to the particular content item. A user can provide multiple user feedback items for one or more content items, and/or multiple users can provide each a user feedback item for one or more content items.

In some implementations, user feedback items are received by collecting data from a random set of users through dialogues structures (e.g., a dialog process) to elicit explicit user responses (e.g., attribute values responsive to attributes) as described with reference to FIG. 3. Additionally, user feedback items can be received in unstructured format (e.g., user-described viewing experience).

Additionally, multiple categorical rating variables are received for one or more content items from multiple users (404). Categorical rating variables include user preferences regarding different attributes available for a content vector representing content item 110. For example, if a user has previously provided user feedback items indicating a high preference for viewing movies in the "comedy" genre and a low preference for viewing movies in the "thriller" genre, then the categorical rating variable for a <genre> attribute would be higher for "comedy" relative to "thriller."

In some implementations, once a threshold for similar or identical categorical rating variables and user feedback items for a content item is surpassed, a content recommendation model 106 can be generated, including a set of themes (406). A theme in a set of themes can include a cluster of content items 110, which are selected to be included in the theme based on a mood of the user (e.g., "happy," "sad," "bored"). Themes can be user-specific such that themes are customized for user preferences. For example, a user may have a "weekend" theme of movies that the user tends to view on weekends, which can include various genres, directors, and plots and can be otherwise unconnected by attribute values (e.g., action films by Steven Spielberg and comedies starring Adam Sandler).

In some implementations, semantic clustering, and/or ranking of the content items 110 can be used to generate themes and rank content items 110 within each generated theme. The set of themes of the content recommendation model 106 can be ranked based on the categorical rating variables (408). Semantic clustering can be achieved using a Latent Semantic Analysis technique (LSA), which can be used to analyze relationships between a set of documents and the terms they contain by producing a set of concepts related to the documents and terms. In some examples, information such as content item plot summaries, unstructured user-provided feedback, expert reviews, and similar metadata are stored as a corpus of information. A set of dimension theme vectors (e.g., 100×50) are trained using appropriate parameters. In response to a user request for a content item, a user-provided input statement is mapped into a latent semantic space generated by the theme vectors, and the top-matched content items are selected.

In some implementations, user feedback items can be received by the content recommendation model through various interactions of a user with the user's social network. In one example, a user may react (e.g., "like") or comment in response to a post by another user in the user's social network regarding a content item (e.g., Mike is watching "The Terminator"). In another example, a user may react to a post by another user in the user's social network that references a content item, for example, a press release about a movie or television show. A user may also post or interact with posts on their own social media page that display information regarding content items, for example, posting a press release about an upcoming film or an opinion editorial or media clip referencing a content item.

In some implementations, implicit feedback is received by the content recommendation model 106 through various interactions of other user's in the user's social network with content items 110. For example, another user in the user's social network posts a review of a movie or television, or a post referencing a viewing of a movie or television show. The content recommendation model 106 can weigh feedback items from other user's in the user's social network based in part on a particular user's level of influence on the user, for example, an amount of interaction between the particular user and the user, an amount of expertise the particular user has regarding the content item (e.g., works in the movie industry), and/or a number of propagations of the user feedback item by other users in the particular user's social network.

Additionally, user feedback items from other users in the user's social network with whom the user has overlapping age group, gender, life style, and sentiments can influence a weight of the particular user feedback item in training a content recommendation model 106 for the user.

In situations in which the systems discussed here collect personal information about users, or may make use of personal information, the users may be provided with an opportunity to control whether applications or features collect user information (e.g., information about a user's social network, social actions or activities, profession, a user's preferences, or a user's current location), or to control whether and/or how to receive content that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a Web browser through which a user may interact with an implementation, or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for interactive content recommendation, the method being executed by one or more processors and comprising:
   generating training data for training a content recommendation model comprising:
      receiving a plurality of user feedback items from a plurality of users, each user feedback item including an attribute value responsive to a content attribute describing a particular content item from a plurality of content items;
      receiving a plurality of categorical rating variables from the plurality of users, each categorical rating variable is responsive to the particular content item from the plurality of content items;
      receiving metadata comprising a plurality of navigational paths for respective selection processes by each user of the plurality of users to select the particular content item of the plurality of content items, wherein each navigational path of the plurality of navigational paths includes attributes provided and attribute values received responsive to the provided attributes during a dialog process interaction; and
      generating the training data for the content recommendation model utilizing the plurality of user feedback items, the plurality of categorical rating variables, and metadata for the plurality of content items;
   training the content recommendation model utilizing the training data;
   receiving, from a user on a user device and by a data processing apparatus, a request for content, the request including a text string input;
   determining, by the data processing apparatus and utilizing the content recommendation model, a user intent based on the text string input;
   providing, by the data processing apparatus and to the user device, a first attribute, the first attribute responsive to the user intent;
   receiving, from the user device and by the data processing apparatus, a first attribute value responsive to the first attribute;
   determining, by the data processing apparatus and utilizing the content recommendation model, a second attribute;
   providing, by the data processing apparatus and to the user device, the second attribute;
   receiving, from the user device and by the data processing apparatus, a second attribute value responsive to the second attribute;
   identifying, by the content recommendation model, a particular content vector for a particular content item, wherein the particular content vector includes a first content attribute describing the particular content item and a second content attribute describing the particular content item, and wherein a threshold amount of overlap is determined between the first content attribute and the second content attribute the first attribute value and the second attribute value, respectively;
   providing, by the data processing apparatus, the particular content item as a suggested content item to the user on the user device; and
   receiving, by the data processing apparatus, a user selection of the particular content item, and in response to the user selection:
      providing, for presentation on the user device, the particular content item for presentation on the user device;
      providing, to the content recommendation model, user selection data representative of a particular navigational path responsive to the request for content; and
      refining the content recommendation model utilizing the user selection data.

2. The method of claim 1, wherein the content recommendation model further comprises:
   a set of themes, each theme comprising a cluster of content items and corresponding user feedback items responsive to the content items,
   wherein each theme is assigned a ranking based on the plurality of categorical rating variables for each content item included in the theme.

3. The method of claim 2, wherein content attribute values describing a particular content item include offline user-provided descriptions of the particular content item.

4. The method of claim 2, wherein the plurality of categorical rating variables include user preferences regarding different attributes available for content vectors representing the content items.

5. The method of claim 2, wherein the plurality of user feedback items include structured and unstructured user feedback data.

6. The method of claim 5, wherein the plurality of user feedback items includes a plurality of social network interactions with a user's social network by a set of other users in the user's social network.

7. The method of claim 6, wherein user interactions further comprise interactions by the user with the user's social network.

8. The method of claim 2, wherein a theme of the set of themes comprises a cluster of content items selected based on a mood of the user.

9. The method of claim 1, wherein receiving a user selection of the particular content item further comprises:
assigning, by the data processing apparatus, a vector attribute score for the particular content vector; and
recording, by the data processing apparatus, the vector attribute score for the particular content vector for the user.

10. One or more non-transitory computer-readable storage media coupled to one or more processors and having instructions stored thereon which, when executed by the one or more processors, cause the one or more processors to perform operations for interactive content recommendation, the operations comprising:
generating training data for training a content recommendation model comprising:
receiving a plurality of user feedback items from a plurality of users, each user feedback item including an attribute value responsive to a content attribute describing a particular content item from a plurality of content items;
receiving a plurality of categorical rating variables from the plurality of users, each categorical rating variable is responsive to the particular content item from the plurality of content items;
receiving metadata comprising a plurality of navigational paths for respective selection processes by each user of the plurality of users to select the particular content item of the plurality of content items, wherein each navigational path of the plurality of navigational paths includes attributes provided and attribute values received responsive to the provided attributes during a dialog process interaction; and
generating the training data for the content recommendation model utilizing the plurality of user feedback items, the plurality of categorical rating variables, and metadata for the plurality of content items;
training the content recommendation model utilizing the training data;
receiving, from a user on a user device and by a data processing apparatus, a request for content, the request including a text string input;
determining, by the data processing apparatus and utilizing the content recommendation model, a user intent based on the text string input;
providing, by the data processing apparatus and to the user device, a first attribute, the first attribute responsive to the user intent;
receiving, from the user device and by the data processing apparatus, a first attribute value responsive to the first attribute;
determining, by the data processing apparatus and utilizing the content recommendation model, a second attribute;
providing, by the data processing apparatus and to the user device, the second attribute;
receiving, from the user device and by the data processing apparatus, a second attribute value responsive to the second attribute;
identifying, by the content recommendation model, a particular content vector for a particular content item, wherein the particular content vector includes a first content attribute describing the particular content item and a second content attribute describing the particular content item, and wherein a threshold amount of overlap is determined between the first content attribute and the second content attribute the first attribute value and the second attribute value, respectively;
providing, by the data processing apparatus, the particular content item as a suggested content item to the user on the user device; and
receiving, by the data processing apparatus, a user selection of the particular content item, and in response to the user selection:
providing, for presentation on the user device, the particular content item for presentation on the user device;
providing, to the content recommendation model, user selection data representative of a particular navigational path responsive to the request for content; and
refining the content recommendation model utilizing the user selection data.

11. The computer storage media of claim 10, wherein the content recommendation model further comprises:
a set of themes, each theme comprising a cluster of content items and corresponding user feedback items responsive to the content items,
wherein each theme is assigned a ranking based on the plurality of categorical rating variables for each content item included in the theme.

12. The storage media of claim 11, wherein the plurality of user feedback items include structured and unstructured user feedback items.

13. The storage media of claim 12, wherein the plurality of user feedback items includes a plurality of social network interactions with a user's social network by a set of other users in the user's social network.

14. The storage media of claim 12, wherein user interactions further comprise interactions by the user with the user's social network.

15. The storage media of claim 11, wherein a theme of the set of themes comprises a cluster of content items selected based on a mood of the user.

16. The storage media of claim 10, wherein receiving a user selection of the particular content item further comprises:
assigning, by the data processing apparatus, a vector attribute score for the particular content vector; and
recording, by the data processing apparatus, the vector attribute score for the particular content vector for the user.

17. A system, comprising:
one or more processors; and
a computer-readable storage device coupled to the one or more processors and having instructions stored thereon which, when executed by the one or more processors, cause the one or more processors to perform operations for interactive content recommendation, the operations comprising:

generating training data for training a content recommendation model comprising:
- receiving a plurality of user feedback items from a plurality of users, each user feedback item including an attribute value responsive to a content attribute describing a particular content item from a plurality of content items;
- receiving a plurality of categorical rating variables from the plurality of users, each categorical rating variable is responsive to the particular content item from the plurality of content items;
- receiving metadata comprising a plurality of navigational paths for respective selection processes by each user of the plurality of users to select the particular content item of the plurality of content items, wherein each navigational path of the plurality of navigational paths includes attributes provided and attribute values received responsive to the provided attributes during a dialog process interaction; and
- generating the training data for the content recommendation model utilizing the plurality of user feedback items, the plurality of categorical rating variables, and metadata for the plurality of content items;

training the content recommendation model utilizing the training data;

receiving, from a user on a user device, a request for content, the request including a text string input;

determining, by utilizing the content recommendation model, a user intent based on the text string input;

providing, to the user device, a first attribute, the first attribute responsive to the user intent;

receiving, from the user device, a first attribute value responsive to the first attribute;

determining, utilizing the content recommendation model, a second attribute;

providing, to the user device, the second attribute;

receiving, from the user device, a second attribute value responsive to the second attribute;

identifying, by the content recommendation model, a particular content vector for a particular content item, wherein the particular content vector includes a first content attribute describing the particular content item and a second content attribute describing the particular content item, and wherein a threshold amount of overlap is determined between the first content attribute and the second content attribute the first attribute value and the second attribute value, respectively;

providing the particular content item as a suggested content item to the user on the user device; and receiving a user selection of the particular content item, and in response to the user selection:
- providing, for presentation on the user device, the particular content item for presentation on the user device;
- providing, to the content recommendation model, user selection data representative of a particular navigational path responsive to the request for content; and
- refining the content recommendation model utilizing the user selection data.

18. The system of claim 17, wherein the content recommendation model further comprises:
- a set of themes, each theme comprising a cluster of content items and corresponding user feedback items responsive to the content items,
- wherein each theme is assigned a ranking based on the plurality of categorical rating variables for each content item included in the theme.

* * * * *